United States Patent Office 2,989,499
Patented June 20, 1961

---

2,989,499
PROCESS EMPLOYING CATALYST
Robert G. Linville, Summit, Robert J. Osborne, Scotch Plains, and Charles L. Smart, Millington, N.J., assignors to Celanese Corporation of America, New York, N.Y., a corporation of Delaware
No Drawing. Filed Apr. 15, 1958, Ser. No. 728,526
10 Claims. (Cl. 260—45.75)

The present invention relates to improvements in the production of linear polyesters and more particularly to catalytic processes for producing linear polyesters through condensation of an ester of a dicarboxylic acid and a glycol.

In one process for preparing filament- or film-forming linear polyesters such as polyethylene terephthalate, a monomeric ester of a dicarboxylic acid and a hydroxy compound (e.g. an alcohol or phenol) such as dimethyl terephthalate is reacted with a glycol such as ethylene glycol to effect ester interchange, thereby forming a hydroxy ester such as bis-2-hydroxyethyl terephthalate and splitting off methanol or other hydroxy compound. After this the temperature is raised to effect condensation to a linear polyester with liberation of the glycol. The reaction mixture, at least in the later stages, has a high melting point (e.g. above about 225° C. and, in the case of the glycol terephthalate, above about 255° C.), and it is necessary to use high temperatures (e.g. about 255–290° C.) to keep the mixture in the liquid condition. To permit the reactions to proceed within a reasonable time interval it has been proposed to add catalysts. Use of many of the catalysts suggested has resulted in products which, while of high molecular weight, are poor in color. Others give products whose color is good but whose molecular weight is too low for commercial use as fiber-forming materials. Even when high molecular weight products of good color are produced the products tend to become somewhat degraded when they are maintained in molten condition, for example during a melt spinning operation, for several hours. Such degradation is shown, for instance, by the fact that the viscosity of the melt may decrease to less than half its original value on standing molten for five hours under an inert atmosphere. This is particularly noticeable when a zinc compound is employed as the catalyst in the esterification.

It is an object of this invention to provide a novel method for reducing the degradation described above.

Another object of this invention is the provision of a catalytic method for the rapid production of polyesters of high resistance to degradation.

Other objects of the invention will become apparent from the detailed description of the invention which follows, wherein all parts and percentages are by weight unless otherwise expressed.

In accordance with one aspect of the invention a high molecular weight linear polyester (e.g. of inherent viscosity of about 0.5 or above) is produced in the presence of a catalyst comprising a zinc salt of a fatty acid, and a hypophosphite salt is then incorporated into the linear polyester. The incorporation of the hypophosphite salt makes the product much more resistant to the degradation described above, even though a catalyst, or catalyst system, which effects relatively rapid reaction is employed.

The conditions of the polyester-forming reaction are conventional whether starting from the dimethyl terephthalate or from the intermediate bis-2-hydroxyethyl terephthalate. Specifically, in the ester interchange reaction of dimethyl terephthalate with ethylene glycol, the glycol is present ordinarily in at least molar proportions, preferably in the neighborhood of twice the molar proportion of the dimethyl terephthalate, although more or less glycol may be used. The materials are heated, preferably in an inert atmosphere, to a temperature at least sufficient to boil off the by-product methanol at the prevailing pressure. While the pressure may be sub-atmospheric or super-atmospheric, atmospheric pressure is adequate since the reaction proceeds at reasonable speed at moderate temperatures, e.g. 140°–230° C. although higher or lower temperatures may be employed. The by-product methanol is preferably removed as formed and the amount of methanol taken off is a measure of the extent to which the ester interchange has proceeded.

The product of the ester interchange reaction, which is generally bis-2-hydroxyethyl terephthalate mixed with low polymers, is then heated further, preferably in an inert atmosphere, to a temperature at which it will condense with liberation of ethylene glycol. The temperature is increased, preferably gradually, during this stage, e.g. to about 260 to 290° C., preferably to about 270 to 285° C. Vacuum is applied at least during the latter stages of the condensation to facilitate removal of by-product ethylene glycol.

A very suitable catalyst system for producing polyesters in accordance with this invention is a combination of zinc acetate or other zinc salt of a fatty acid (e.g. zinc propionate) and an organophosphine. The organophosphine may be added when the polycondensation is to be effected. The zinc salt may be added at that stage or may already be present, having been added during or prior to, formation of the bis-2-hydroxyethyl terephthalate and low polyesters through ester interchange. Preferably, both the organophosphine and the zinc salt are present during the ester interchange and are carried through to the condensation stage. The zinc salt and the organophosphine may be added separately or they may be combined before they are added to the reactants.

Suitable organophosphines which may be used in the practice of the present invention include aryl phosphines, alkyl phosphines, alkaryl phosphines, aralkyl phosphines and derivatives thereof having inert substituents such as alkoxy radicals. Best results are achieved when the organophosphine is a (poly-organo)-phosphine, i.e. a secondary or tertiary phosphine wherein the phosphorus atom is attached directly to two or three organic radicals, preferably to three organic radicals. Representative organophosphines include triphenyl phosphine, tri-biphenyl phosphine, tri-butyl phosphine, phenyldibutyl-phosphine, 4-phenoxyphenyldibutylphosphine, methyldiphenylphosphine, 4-methylphenyldiphenylphosphine, diphenylphosphine and the like. Preferably the zinc acetate and the organophosphine are dissolved (either as such or by reaction) in the reaction mixture. It is desirable to have present at least ½ atom, preferably about 1 to 3 atoms, of phosphorus (from the organophosphine) per atom of zinc; an excess of the organophosphine may be employed, such as proportions of 5 and even 30 atoms of phosphorus (from the organophosphine) per atom of zinc. The amount of zinc salt usually is in the range of about 0.005 to 0.5%, preferably 0.01 to 0.1%, based on the weight of the final polyester; in the preferred form, in which dimethyl terephthalate is used in the production of polyethylene terephthalate, the weight of dimethyl terephthalate used is very close to that of the final polyester and, for convenience, these same ranges may be based on the weight of the dimethyl terephthalate.

It is believed that the unexpected synergistic effects obtained by the use of the zinc salt in combination with the organophosphine may be explained by the formation of a complex between these materials, which complex is more active catalytically than the individual components.

The reaction mass either for ester interchange or condensation, in addition to the reactants and catalyst, may contain additional catalysts, promoters, or the like, to improve the product or to be carried along into the product for special effects.

While the invention has been described with particular reference to the production of polyethylene terephthalate, in which it finds its greatest utility, it may be used also in the manufacture of high linear polyesters (including polyester esters) derived from other glycols, and/or from other dicarboxylic acids, especially aromatic dicarboxylic acids with their carboxyl groups linked to the aromatic nucleus or nuclei in diametrically opposite positions. Examples of such other dicarboxylic acids and glycols include certain substituted terephthalic acids, diphenyl-4,4'-dicarboxylic acid,
$\alpha,\beta$-diphenylethane-4,4'-dicarboxylic acid,
$\alpha,\delta$-diphenylbutane-4,4'-dicarboxylic acid and other $\alpha,\omega$-diphenylalkane-4,4'-dicarboxylic acids,
$\alpha,\beta$-diphenoxyethane-4,4'-dicarboxylic acid,
$\alpha,\delta$-diphenoxy-butane-4,4'-dicarboxylic acid, and other $\alpha,\omega$-diphenoxy-alkane-4,4'-dicarboxylic acids; and trimethylene and propylene glycols.

The following example is given to illustrate this invention further. In this example the "inherent viscosity" is equal to $$\frac{ln \eta_r}{c}$$

where $\eta_r$ is the relative viscosity (i.e. the solution/solvent viscosity ratio) and $c$ is the concentration in grams per 100 ml. of solution, the inherent viscosity in each case being measured for a solution, of concentration 0.1 g./100 ml., in a 10/7 mixture of phenol/2,4,6-trichlorophenol at 25° C. In the example, the reactions and other procedures are carried out under an atmosphere of prepurified nitrogen (after initial purification of the reaction mixture under vacuum to removed occluded or dissolved gases); however, when the stage of condensation is reached where the pressure is reduced below about 5 mm. Hg absolute the nitrogen supply is, for convenience, cut off but is resumed when the pressure is allowed to rise at the conclusion of the process. The pressure is atmospheric unless otherwise specified.

*Example*

100 parts dimethyl terephthalate, 65 parts ethylene glycol, 0.02 part zinc acetate dihydrate and 0.06 part triphenyl phosphine are mixed and heated to 180° C.; methanol is evolved from the agitated clear melt. Removal of 85% of the theoretical of methanol at 180–190° C. requires approximately 2 hours. The temperature is then raised to 280° C. in 1.5 hours. At this stage the pressure is reduced to less than 2 mm. Hg absolute over a period of 0.5 hour, and after 3.5 more hours at 280° C. a viscous polymer of inherent viscosity 0.64 is formed. The polymer is cooled to solidify it and is formed into chips and mixed with 0.08% of its weight of magnesium hypophosphite hexahydrate. The mixture is melted by heating it in 45 minutes to 280° C. under a reduced pressure of 175 mm. Hg absolute, after which the pressure is reduced rapidly (in about 5 minutes) to 4 mm. Hg absolute. The melt is stirred under this pressure for 30 minutes, the heat is then removed and the melt is allowed to cool under an atmosphere of prepurified nitrogen. The product is then tested by remelting it and allowing to stand for 5 hours at 280° C. in an atmosphere of prepurified nitrogen. At the end of this five-hour period the melt viscosity is reduced by only 31%. In contrast, when an otherwise identical product, made in the same way but free from the hypophosphite, is tested the melt viscosity drops by 60%. Also, by way of comparison, when zinc chloride is substituted for zinc acetate in the same type of catalyst system, the addition of the magnesium hypophosphite to the resulting polyester gives little if any improvement in resistance to reduction of melt viscosity.

Examples of other hypophosphite salts are the calcium, manganous and potassium hypophosphites. The proportion of hypophosphite salt may be, for example, in the range of about 0.005 to 2% based on the weight of the polyester.

It is to be understood that the foregoing detailed description is given merely by way of illustration and that many variations may be made therein without departing from the spirit of our invention.

Having described our invention what we desire to secure by Letters Patent is:

1. In the process for the production of linear filament-forming polyesters by the condensation of an ester of a dicarboxylic acid and a glycol in the presence of a catalyst comprising a zinc salt of a fatty acid, the improvement which comprises adding a member of the group consisting of magnesium and calcium hypophosphites to the resulting filament-forming polyester.

2. In the process for the production of linear filament-forming polyesters by the condensation of an ester of terephthalic acid and ethylene glycol in the presence of a catalyst comprising a zinc salt of a fatty acid, the improvement which comprises adding a member of the group consisting of magnesium and calcium hypophosphites to the resulting filament-forming polyester.

3. Process as set forth in claim 2 in which the zinc salt is zinc acetate.

4. Process as set forth in claim 3 in which said catalyst comprises also triphenyl phosphine.

5. Process as set forth in claim 2 in which said catalyst comprises also an organophosphine.

6. A fiber-forming polyethylene terephthalate produced in the presence of a catalyst comprising a zinc salt of a fatty acid, said polyethylene terephthalate comprising, as an inhibitor, a minor amount of a member of the group consisting of magnesium and calcium hypophosphites.

7. A fiber-forming polyethylene terephthalate produced in the presence of a catalyst comprising zinc acetate, said polyethylene terephthalate being of inherent viscosity of at least about 0.5 and comprising, as an inhibitor against reduction of melt-viscosity on prolonged melting, 0.005 to 2% of magnesium hypophosphite.

8. A fiber-forming polyethylene terephthalate produced in the presence of a catalyst comprising zinc acetate and an organophosphine, said polyethylene terephthalate being of inherent viscosity of at least about 0.5 and comprising, as an inhibitor against reduction of melt-viscosity on prolonged melting, 0.005 to 2% of magnesium hypophosphite.

9. A fiber-forming polyethylene terephthalate produced in the presence of a catalyst comprising zinc acetate and triphenylphosphine, said polyethylene terephthalate being of inherent viscosity of at least about 0.5 and comprising, as an inhibitor against reduction of melt-viscosity on prolonged melting, 0.08% magnesium hypophosphite hexahydrate.

10. A fiber-forming polyethylene terephthalate produced in the presence of a catalyst comprising a zinc salt of a fatty acid, said polyethylene terephthalate comprising a member of the group consisting of magnesium and calcium hypophosphites in amount sufficient to act as an inhibitor against reduction of melt-viscosity on prolonged melting of said polyethylene terephthalate.

References Cited in the file of this patent

Schildknecht: Polymer Processes, High Polymers, vol. X, Interscience Publishers, New York, copyright 1956, pages 540–542.